March 25, 1952     A. G. ADAIR     2,590,363
WHEEL ADAPTABLE TO DIFFERENT HUBS

Filed Jan. 26, 1948

A. G. ADAIR
INVENTOR

BY *Herbert J. Brower*
ATTORNEY

Patented Mar. 25, 1952

2,590,363

UNITED STATES PATENT OFFICE 2,590,363

WHEEL ADAPTABLE TO DIFFERENT HUBS

Adolphus G. Adair, Fort Worth, Tex.

Application January 26, 1948, Serial No. 4,271

3 Claims. (Cl. 301—9)

This invention relates to automobile wheels and has reference to a wheel which is adaptable to most makes of automobiles.

Particularly, the invention has to do with a temporary wheel which, by reason of a relatively simple pattern of openings therein, may be readily positioned on a wheel hub having various numbers of lugs or studs for engaging the regular wheel in place. Different makes of automobiles have either lugs or studs where centers are at different radii about the center of the wheel. Also, the number of studs or lugs vary according to the make of automobile.

It is therefore an object of this invention to provide a wheel construction which is adaptable to all or nearly all automobile wheel hubs. Many makes of automobiles have projecting rivets in the face of the wheel hubs, and where studs are used instead of nuts for holding the stock wheels in place, pilots project from the face of the hub to engage pilot holes in the wheels for properly mounting the wheels in place. The present invention also accommodates such rivets and pilots without complicating the pattern of openings, thus retaining the referred simplified pattern for convenient mounting of the present wheel.

Another object of the invention is to provide a temporary wheel for service stations whereby tire repairs may be made in the station where equipment is available. By taking the present temporary wheel with an inflated tire thereon to the automobile in need of repair, removing the flat tire therefrom, placing the temporary wheel thereon, and carrying the flat tire back to the service station, repairs may be conveniently made and during which time the automobile with the temporary wheel may be used, thus effecting a saving in time to the owner of the automobile as well as to the station operator. However, the present invention can be used as a permanent wheel when desired.

These and other objects of the invention will become apparent from the following description of the form of the invention illustrated in the accompanying drawings, wherein.

Figure 1:
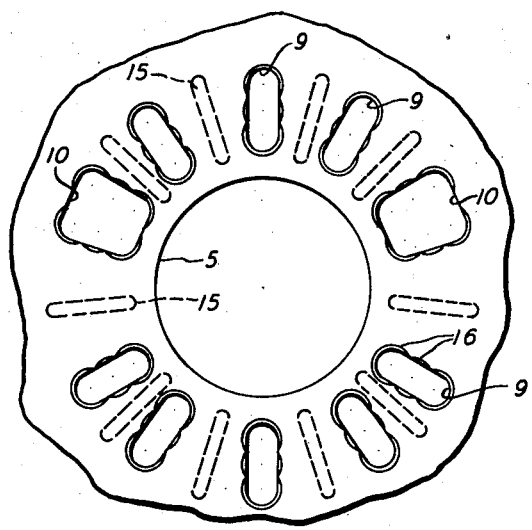
Figure 1 is a broken elevational view of the center portion of a temporary wheel embodying an arrangement of openings therethrough for accommodating the bolts and nuts, or lugs, for mounting the wheel on different makes of automobiles.
Figure 2:
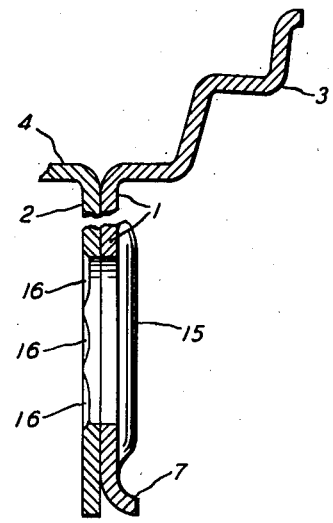
Figure 2 is an enlarged lateral sectional view taken through any one of the openings illustrated in Figure 1, and showing one of the ribs on the back surface of the wheel for accommodating rivets on the wheel hub.
Figure 3:
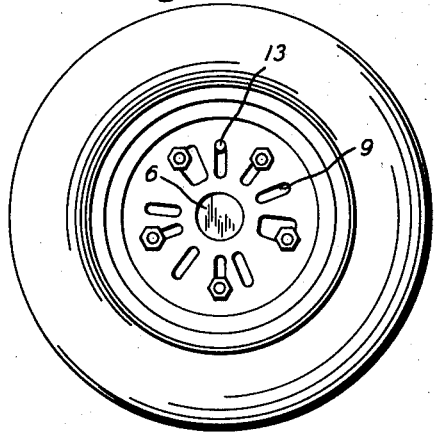
Figure 3 is an elevational view of the present temporary wheel and illustrating the same mounted on a wheel hub by means of five retaining nuts and aligned by means of a pilot projecting from the said hub.
Figure 4:
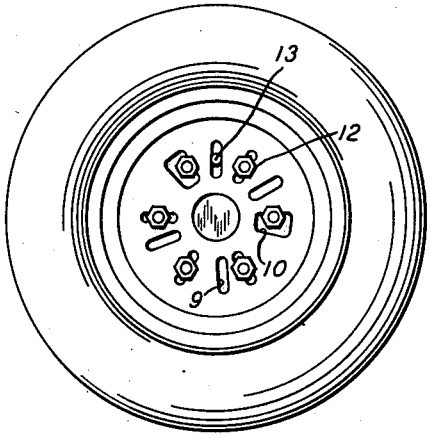
Figure 4 is a view similar to Figure 3, but showing the present wheel mounted on a wheel hub by means of six retaining nuts. It will be noted that the radii of the last referred to nuts with reference to the hub center are less than the corresponding radii in Figure 3.
Figure 5:
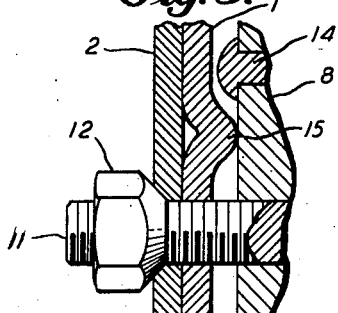
Figure 5 is a lateral sectional view, showing a broken portion of the wheel hub, a bolt projecting therefrom, a nut on the bolt, and particularly showing the relation of a lateral section of one of the referred to ribs with respect to the head of a rivet projecting from the said hub.

The temporary wheel illustrated is formed of inner and outer stamped members 1 and 2, respectively, having flanges 3 and 4 at their peripheries to accommodate a pneumatic tire. The members 1 and 2 are welded together at their flat central areas or body partitions, and both members are provided with a central opening 5 to accommodate the axle 6 of the automobile. The inner member 1 may be inwardly flanged, as at 7, within the opening 5 so as to engage the surface of the wheel hub 8.

The body areas around the central opening 5 are provided with radially disposed elongated openings 9, which openings are formed through both members 1 and 2. Two other openings 10 are similarly disposed through the members 1 and 2, but are wider than the openings first referred to so as to accommodate two of either five or six stud and nut arrangements. The bolts and nuts herein referred to are respectively numbered 11 and 12. It is to be understood that lugs (not shown) are sometimes used in place of the described bolt and nut arrangement. Pilots 13 are sometimes provided on the wheel hubs 8, and which pilots are readily accommodated by one of the slots 9 adjacent one of the wider openings 10.

Projecting rivets 14, present on the faces of some hubs 8, are accommodated by radially disposed ribs 15 which project from the surface of the inner member 1 and between the openings 9 to space the wheel from the hub.

Partial countersinks 16 are formed in the outer peripheries of the openings 9 and 10 to accommodate chamfers of the nuts 12 (or lugs referred to), the said countersinks being arranged according to the radii of hub studs 11 relative to the center of the hub 8 for different makes of automobiles.

By reason of the relatively few openings 9 and 10 through the members 1 and 2, and the relatively simple pattern of the same, the wheel may be readily positioned on the wheel hub 8 even though the studs 11 may vary in number, so long as they conform to standard arrangements. Similarly, the radii may vary according to standard practices, and yet the wheel may be readily positioned on the hub 8.

The described form of the invention is not restrictive, but may be made in many ways within the scope of the appended claims.

What is claimed is:

1. In a wheel for automobiles, or the like, an arrangement of multiple elongated openings through the body of the wheel and wherein the length of each said slot is radially disposed with respect to the center of said wheel, certain of the said openings being wider than others whereby the said wheel may be mounted on different automobile hubs having various arrangements for ordinarily mounting stock wheels thereon.

2. In a wheel for automobiles, an arrangement of multiple elongated openings through the body of the wheel and wherein the length of each said slot is radially disposed with respect to the center of said wheel, countersinks in the peripheries of the said openings, said arrangement providing means whereby the said wheel may be mounted on different automobile hubs having different arrangements for ordinarily mounting stock wheels thereon.

3. In a wheel for automobiles or the like, an arrangement of multiple elongated openings through the body of the wheel and wherein the length of each said slot is radially disposed with respect to the center of said wheel and whereby said wheel may be mounted on different automobile hubs having different arrangements for mounting stock wheels thereon, and projecting ribs on the inner surface of said wheel whereby the same may be spaced from the automobile hub so as to accommodate projecting rivets on the latter.

ADOLPHUS G. ADAIR.

REFERENCES CITED

The following references are of record in the file of this patent:

UNITED STATES PATENTS

| Number | Name | Date |
| --- | --- | --- |
| 697,827 | Fluder | Apr. 15, 1902 |
| 1,712,322 | Bachrach | May 7, 1929 |
| 1,901,235 | Glowacki | Mar. 14, 1933 |
| 2,130,448 | Signori | Sept. 20, 1938 |
| 2,176,544 | Ploehn | Oct. 17, 1939 |
| 2,330,085 | Shaw | Sept. 21, 1943 |
| 2,424,106 | Martens | July 15, 1947 |